(12) United States Patent
Vorst et al.

(10) Patent No.: US 9,110,358 B1
(45) Date of Patent: Aug. 18, 2015

(54) METHOD FOR CREATING AND A SYSTEM FOR USING A CONSTANT VERTICAL RESOLUTION TOROIDAL DISPLAY

(71) Applicant: The Boeing Company, Chicago, IL (US)

(72) Inventors: Carl J. Vorst, St. Ann, MO (US); Harold R. Streid, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 13/909,392

(22) Filed: Jun. 4, 2013

(51) Int. Cl.
| G03B 21/00 | (2006.01) |
| G03B 21/56 | (2006.01) |
| H04N 9/31 | (2006.01) |
| G03B 21/606 | (2014.01) |
| G09B 9/02 | (2006.01) |

(52) U.S. Cl.
CPC .............. G03B 21/00 (2013.01); G03B 21/606 (2013.01); G09B 9/02 (2013.01); H04N 9/3147 (2013.01); H04N 9/3185 (2013.01); H04N 9/3188 (2013.01); H04N 9/3197 (2013.01)

(58) Field of Classification Search
CPC ... G03B 21/00; H04N 9/3197; H04N 9/3185; H04N 9/3188; H04N 9/3147
USPC ......... 353/74, 30; 348/744, E9.025; 359/460, 359/451
See application file for complete search history.

(56) References Cited

U.S. PATENT DOCUMENTS

| 3,785,715 A | 1/1974 | Mecklenborg |
| 4,899,293 A | 2/1990 | Dawson et al. |
| 5,130,794 A | 7/1992 | Ritchey |
| 5,320,534 A | 6/1994 | Thomas |
| 6,137,492 A | 10/2000 | Hoppe |
| 6,152,739 A | 11/2000 | Amery et al. |
| 6,243,207 B1 | 6/2001 | Kawamura et al. |
| 6,373,489 B1 | 4/2002 | Lu et al. |
| 6,600,485 B1 | 7/2003 | Yoshida et al. |
| 6,618,049 B1 | 9/2003 | Hansen |
| 6,811,264 B2 | 11/2004 | Raskar et al. |

(Continued)

OTHER PUBLICATIONS

Rockwell Collins Griffin Rear-Projected Dome, http://www.rockwellcollins.com/sitecore/content/Data/Products/Simulation/Visual_Display_Systems/Griffin Rear-Projected Dome.aspx , 2011.\.

(Continued)

*Primary Examiner* — William C Dowling
*Assistant Examiner* — Magda Cruz
(74) *Attorney, Agent, or Firm* — Baldauff IP, LLC; Michael J. Baldauff, Jr.

(57) ABSTRACT

The present disclosure is generally directed to methods of creating and a visual image projection and display system including a tessellation of toroidal constant vertical resolution surfaces to display a single substantially constant vertical resolution image by blending projected images on adjacent constant vertical resolution surfaces. Each toroidal constant vertical resolution surface is defined by any horizontal section of the constant vertical resolution surface normal to a central vertical axis of the tessellation of constant vertical resolution surfaces being a constant distance from the central vertical axis. The system further includes a top surface screen intersecting the tessellation of toroidal constant vertical resolution surfaces defined by a circular azimuth curve, and a set of image projectors corresponding to each constant vertical resolution surface of the tessellation of toroidal constant vertical resolution surfaces and the top surface screen.

20 Claims, 13 Drawing Sheets

(56) References Cited

U.S. PATENT DOCUMENTS

| | | |
|---|---|---|
| 7,414,595 B1 | 8/2008 | Muffler |
| 7,619,626 B2 | 11/2009 | Bernier |
| 7,907,167 B2 | 3/2011 | Vesely et al. |
| 8,194,193 B2 | 6/2012 | Streid et al. |
| 8,241,038 B2 | 8/2012 | Quinn et al. |
| 2003/0194683 A1 | 10/2003 | Vorst |
| 2003/0224333 A1 | 12/2003 | Vastvedt |
| 2006/0256113 A1 | 11/2006 | Grover et al. |
| 2009/0066858 A1 | 3/2009 | Turner et al. |
| 2009/0189917 A1 | 7/2009 | Benko et al. |
| 2009/0201430 A1* | 8/2009 | Streid et al. .................. 348/744 |
| 2009/0231331 A1 | 9/2009 | Holland |
| 2010/0027093 A1 | 2/2010 | Doucet |
| 2012/0001915 A1 | 1/2012 | Peterson |

OTHER PUBLICATIONS

Browne, Mike et al., Vergence Mismatch Effects in a Binocular See-through HMD integrated with Faceted Simulators, Proceedings of the Interservice/Industry Training, Simulation, and Education Conference, 2008.

* cited by examiner

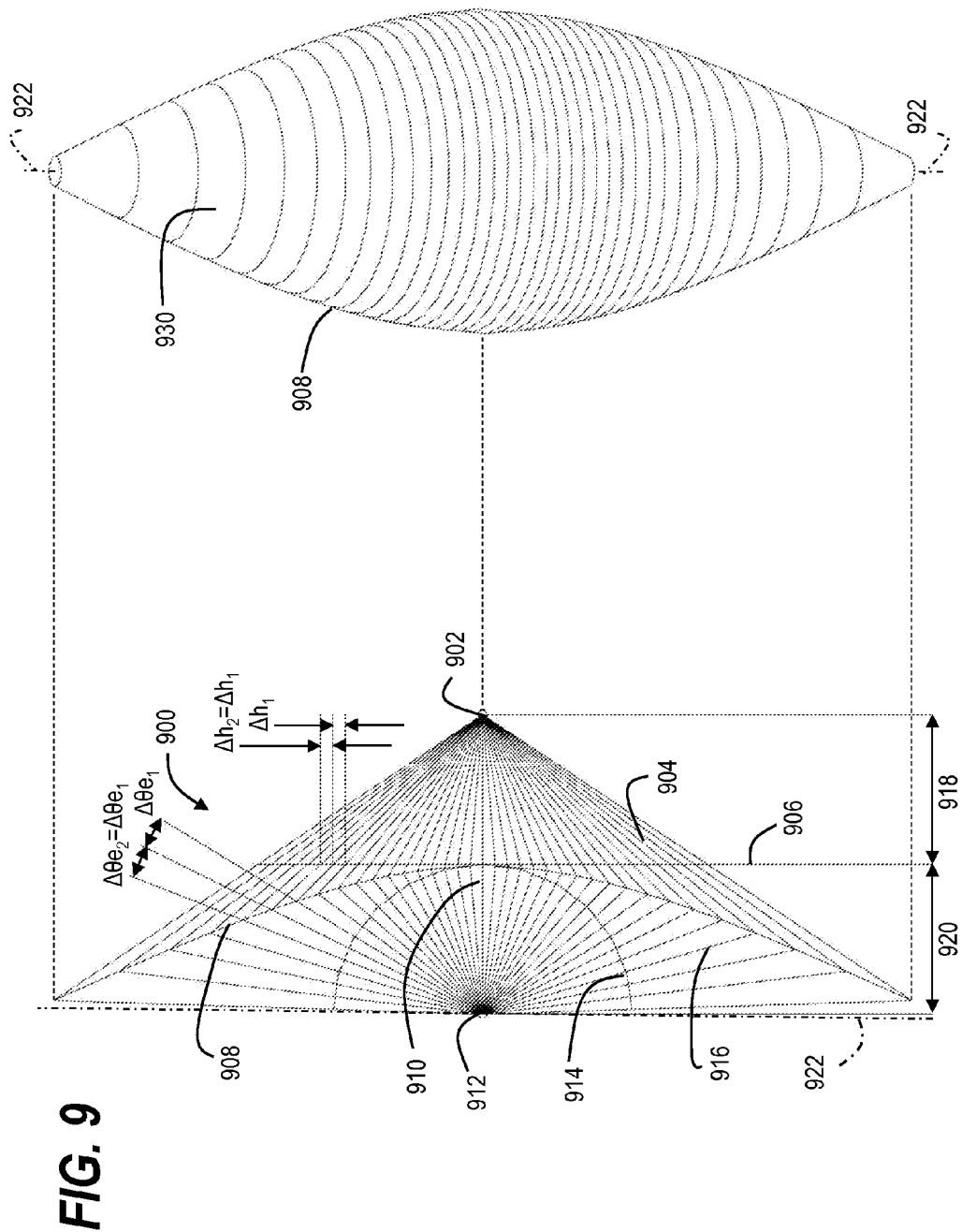

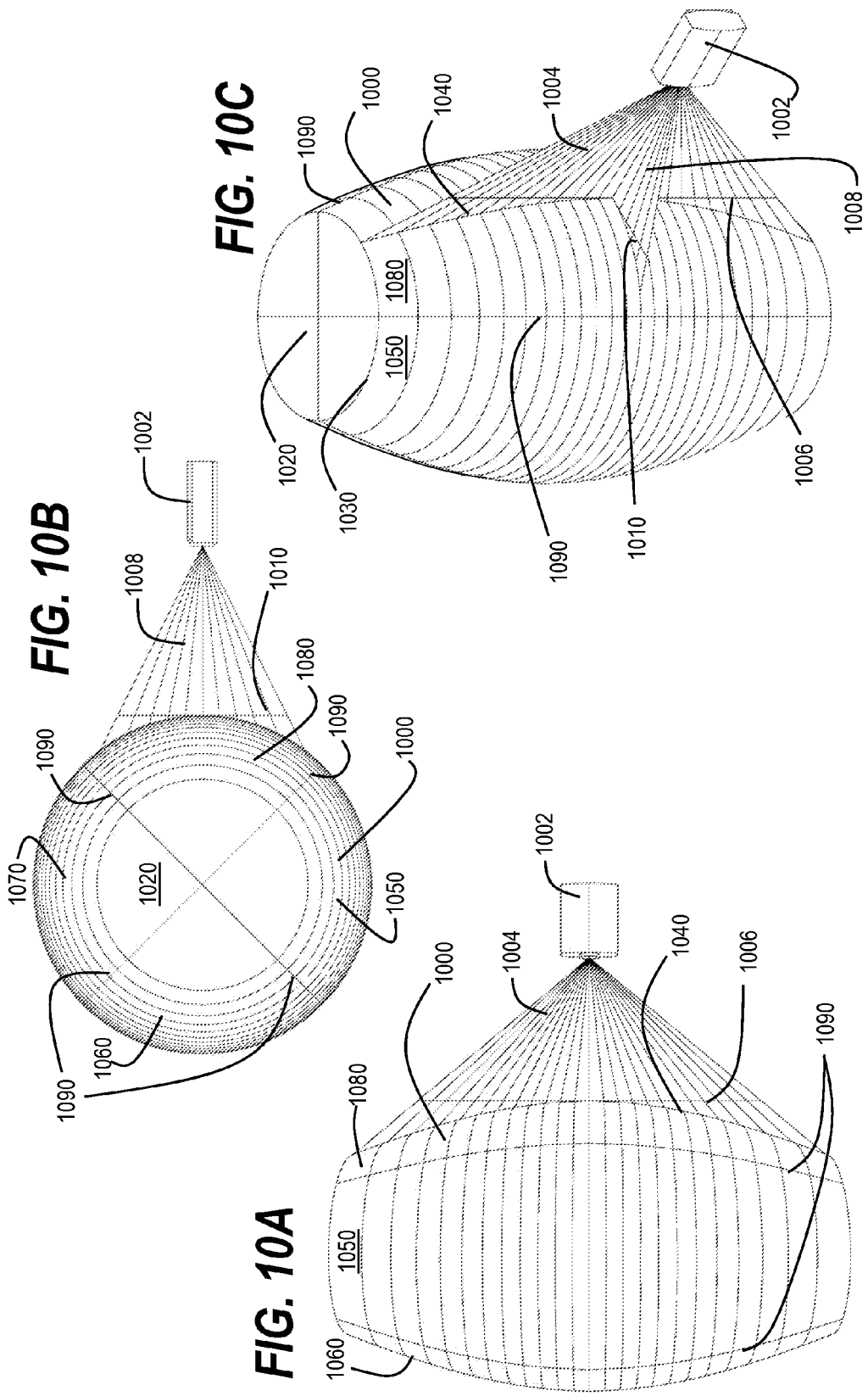

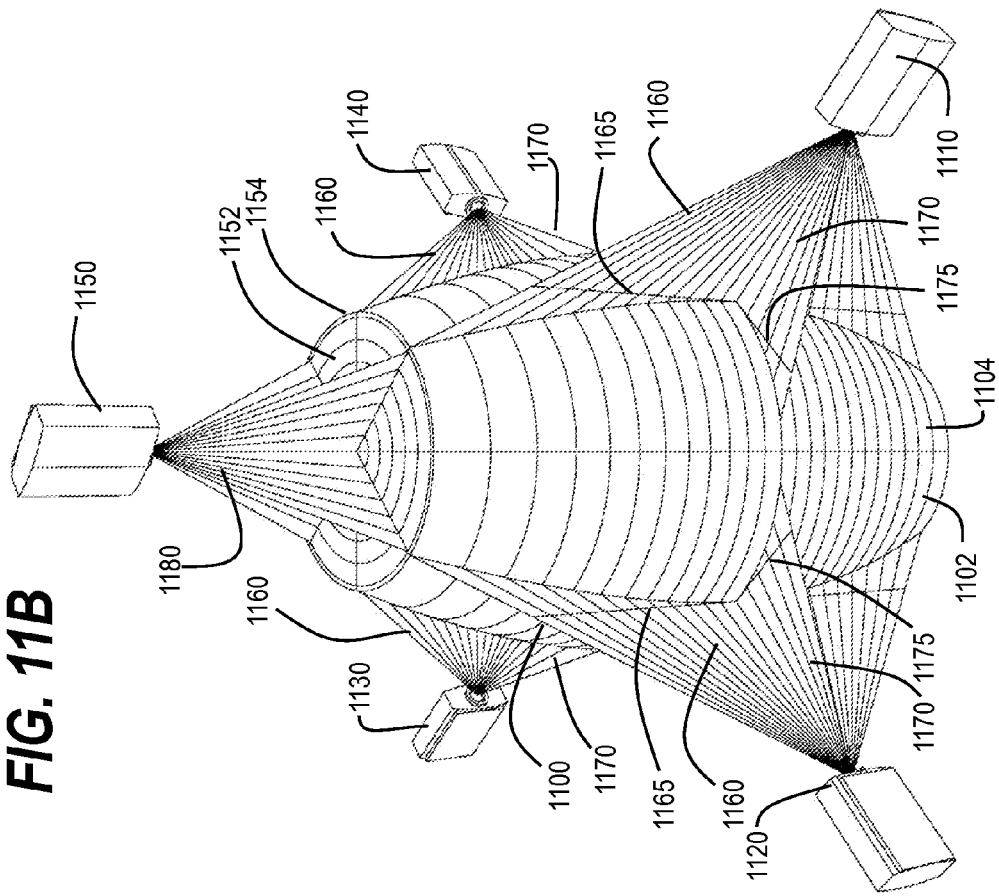
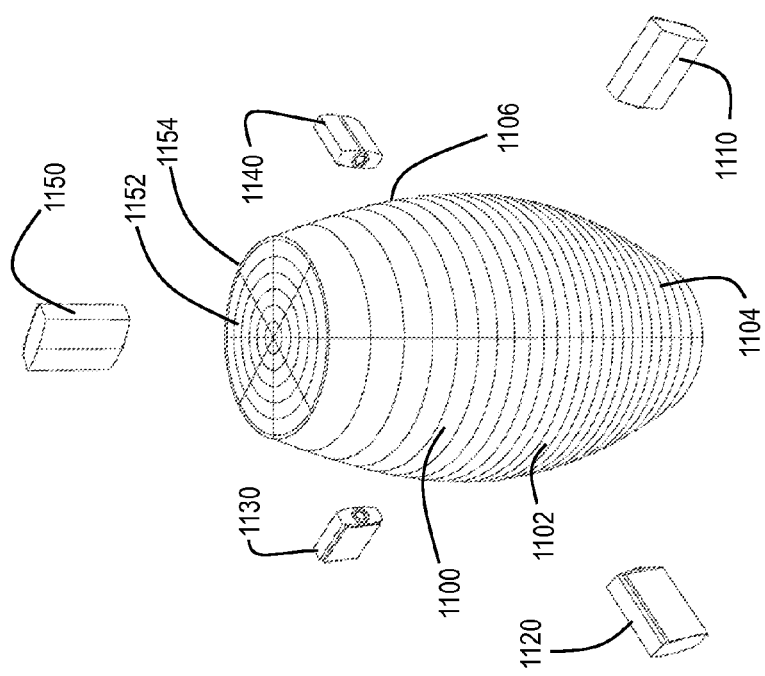
FIG. 11B
FIG. 11A

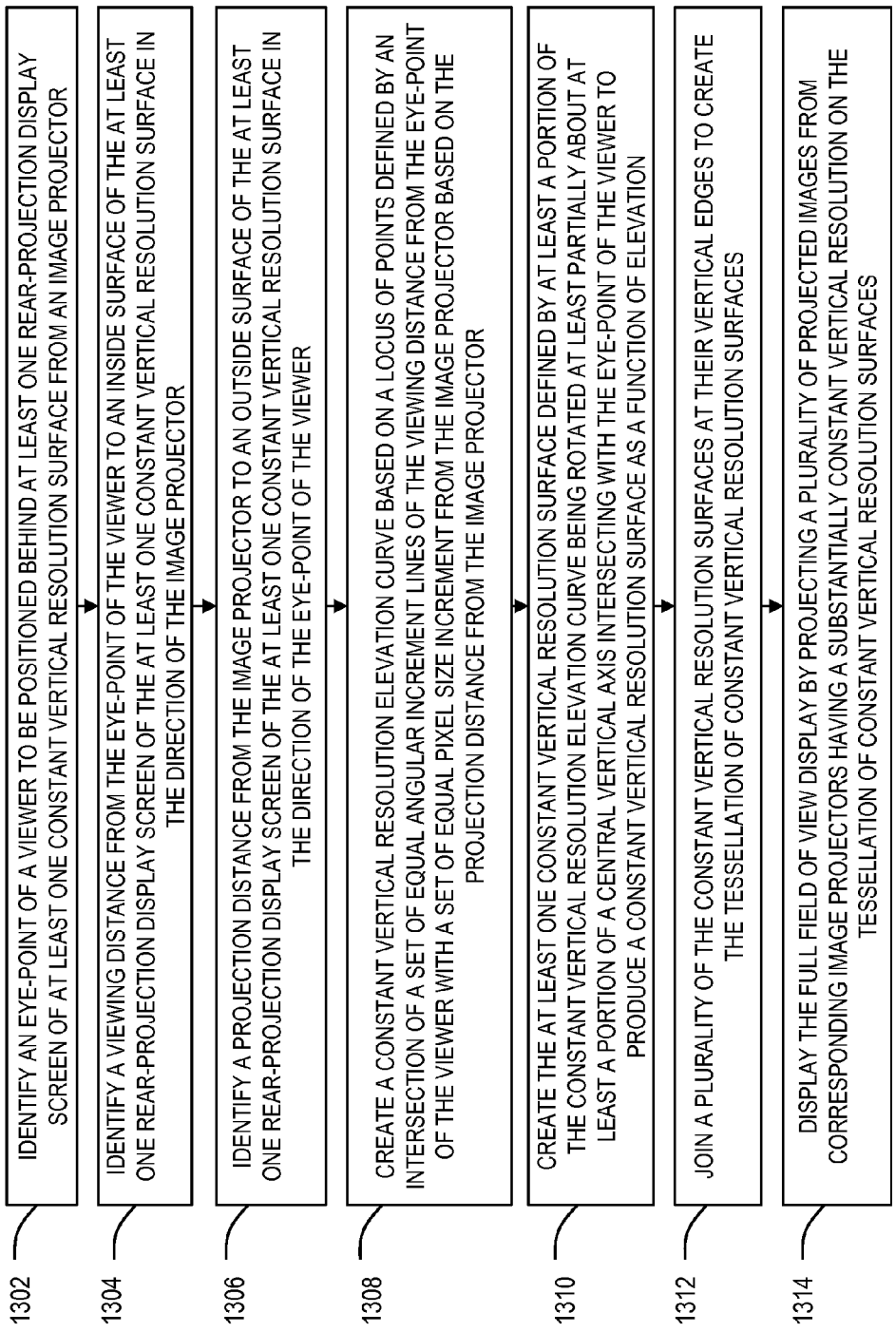

METHOD FOR CREATING AND A SYSTEM FOR USING A CONSTANT VERTICAL RESOLUTION TOROIDAL DISPLAY

TECHNICAL FIELD

The embodiments presented herein are generally to projection display systems having a constant vertical resolution as a function of elevation. More particularly, the present application is directed to a method and system for a visual image projection and display system that create a wide field of view display using fixed matrix projectors that are preferably of high definition format.

BACKGROUND

A simulator is a device that simulates a particular experience as realistically as possible. For example, a flight simulator simulates the experience of flying an aircraft, such as an airplane or helicopter. A vehicle driver simulator attempts to create the experience of driving a vehicle over streets or off-road terrains. Simulators typically use display systems to create a field of view displaying what the user might see if the user were actually flying an aircraft or driving a vehicle. Simulators may also provide simulated controls and steering devices associated with the particular aircraft or vehicle, and/or added motion to simulate movement of the aircraft or vehicle.

The visual systems currently in use in simulators were developed for use with four by three (4:3) aspect ratio cathode ray tube (CRT) projectors. However, currently available simulators do not fully exploit the recent advances in visual display technology, such as fixed matrix digital projectors in general, and especially High Definition Television (HDTV) format fixed matrix projectors with wide aspect ratios, such as, without limitation, sixteen by nine (16:9) aspect ratio format. Also, the modern fixed matrix projectors do not have the ability for image scaling without the loss of image resolution since the image source is made up of a mechanically fixed array of image sources instead of a continuous image surface, as with a CRT projector.

In addition, because the shape of the flat screen segments used to tessellate an arrangement of rear projection screens around the eye-point in currently available simulators were designed for four by three (4:3) aspect ratio projectors, the resulting display systems are poorly suited to the use of wide aspect ratios typically used in high definition systems.

For simulation display purposes, users have assumed a goal of providing eye-limited visual performance. Existing display systems have typically used arrangements of flat rear projection screens or dome shaped rear projection screens, neither of which are optimum for creating an eye-limited wide field of view display with constant vertical resolution from the eye-point. In other words, existing display system screens are not capable of providing an eye-limited full field of view display for simulators, such as aircrew training systems. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a method of producing a toroidal constant vertical resolution surface acting as a rear-projection display screen for receiving and displaying a substantially constant vertical resolution projected image from an image projector includes identifying an eye-point of a viewer to be positioned behind the rear-projection display screen of the constant vertical resolution surface from the image projector. The method further identifies a viewing distance from the eye-point of the viewer to an inside surface of the rear-projection display screen of the constant vertical resolution surface in the direction of the image projector. The method further identifies a projection distance from the image projector to an outside surface of the rear-projection display screen of the constant vertical resolution surface in the direction of the eye-point of the viewer. A constant vertical resolution elevation curve is created based on a locus of points defined by an intersection of a set of equal angular increment lines of the viewing distance from the eye-point of the viewer with a set of equal pixel size increment lines from the image projector based on the projection distance from the image projector. The constant vertical resolution surface is created by defining at least a portion of the constant vertical resolution elevation curve being at least partially rotated about at least a portion of a central vertical axis intersecting with the eye-point of the viewer to produce a constant vertical resolution surface as a function of elevation. The surface formed is a toroid, with the vertical curvature being a substantially constant resolution curve and the horizontal curvature a circle centered about a central vertical axis intersecting with the viewer's eye-point.

In another embodiment disclosed herein, a method of producing a full field of view display with a constant vertical resolution on a tessellation of toroidal constant vertical resolution surfaces acting as rear-projection display screens that receive and display substantially constant vertical resolution projected images from corresponding image projectors. The method includes identifying an eye-point of a viewer to be positioned behind at least one rear-projection display screen of at least one constant vertical resolution surface from an image projector. The method further identifies a viewing distance from the eye-point of the viewer to an inside surface of the at least one rear-projection display screen of the at least one constant vertical resolution surface in the direction of the image projector. The method further identifies a projection distance from the image projector to an outside surface of the at least one rear-projection display screen of the at least one constant vertical resolution surface in the direction of the eye-point of the viewer. A constant vertical resolution elevation curve is created based on a locus of points defined by an intersection of a set of equal angular increment lines of the viewing distance from the eye-point of the viewer with a set of equal pixel size increment lines of the projected image from the image projector based on the projection distance from the image projector. The at least one toroidal constant vertical resolution surface is created by defining at least a portion of the constant vertical resolution elevation curve being rotated at least partially about at least a portion of a central vertical axis constant vertical resolution intersecting with the eye-point of the viewer to produce a constant vertical resolution surface as a function of elevation and a horizontal curvature a circle centered about a central vertical axis intersecting with the viewer's eye-point. A plurality of the constant vertical resolution surfaces is then joined at their vertical edges to create the tessellation of constant vertical resolution surfaces where each vertical edge of constant vertical resolution surface is defined by the constant vertical resolution elevation curve and a horizontal curvature a circle centered about a central vertical axis intersecting with the viewer's eye-point. The method further displays the full field of view display by projecting a plurality of projected images from corresponding image projectors having a substantially constant vertical resolution on the tessellation of constant vertical resolution surfaces.

In another embodiment disclosed herein, a visual image projection and display system includes a tessellation of toroidal constant vertical resolution surfaces to display a single substantially constant vertical resolution image by blending projected images on adjacent toroidal constant vertical resolution surfaces, wherein each toroidal constant vertical resolution surface is defined by any horizontal section of the constant vertical resolution surface normal to a central vertical axis of the tessellation of constant vertical resolution surfaces being a constant distance from the central vertical axis. The system further includes a top surface screen intersecting the tessellation of constant vertical resolution surfaces defined by a circular azimuth curve, and a set of image projectors corresponding to each constant vertical resolution surface of the tessellation of constant vertical resolution surfaces and the top surface screen.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 9 illustrates another embodiment of creating a constant vertical resolution curvature screen surface;

FIGS. 10A-10C illustrate another embodiment of a constant vertical resolution curvature screen surface used to receive an image from a single projection device;

FIGS. 11A-11B illustrate another embodiment of a constant vertical resolution curvature screen surface used to receive a number of images from a corresponding number of projection devices;

FIG. 13 is a logic flowchart illustrating another process for producing a full field of view display with a constant vertical resolution on a tessellation of constant vertical resolution surfaces in accordance with the embodiments presented.

DETAILED DESCRIPTION

The embodiments presented herein are related to a display device that uses toroidal constant vertical resolution rear-projection screen geometry in one axis (e.g. vertical axis) and circular geometry in the other axis. The result is an egg shaped rear-projected visual display system that provides improved binocular head mounted display performance over typical constant vertical and horizontal resolution display geometry. The embodiments presented herein also remove the appearance of geometric discontinuities at the junction of screens in a multi-screen faceted configuration.

Prior art constant resolution visual system (CRVS) screen have constant resolution in both the horizontal and vertical directions. The embodiments disclosed herein only provide a constant resolution in the vertical direction. The present embodiments yield an improved performance when the user views an image on the screen with augmented reality head mounted displays and that, although resolution is not constant in the horizontal direction, it has relatively minimal impact on image quality and the efficiency of displaying projected pixels. The current embodiments requires far fewer image projectors than pure dome displays, and remove visual discontinuities that exist in prior art adjoining sections of adjacent panels that have constant resolution in both the horizontal and the vertical direction.

By using constant vertical resolution geometry in one axis and aligning the long axis of a High Definition (HD) aspect ratio projector with that axis, a considerably larger angle can be covered than possible with either a flat or domed screen. Aligning the short axis of an HD aspect ratio projector in the direction of circular curvature results in minimal resolution variation and removes the appearance of geometric discontinuities at the junction of screens if the viewer is not positioned at the design eye-point. High definition systems are designed for utilization with higher aspect ratios and are capable of displaying images designed for screens with a greater width. In this case, the system is optimized for high aspect ratio (HD) projectors where the image is rotated 90 degrees to produce an image with greater height than width. An example of the optimization in the embodiments presented herein is that typical prior art systems using pure spherical domes for a rear projected display surface require approximately twice the number of image projectors and produce a substantially lower display resolution as the embodiments presented herein.

Figure 1:
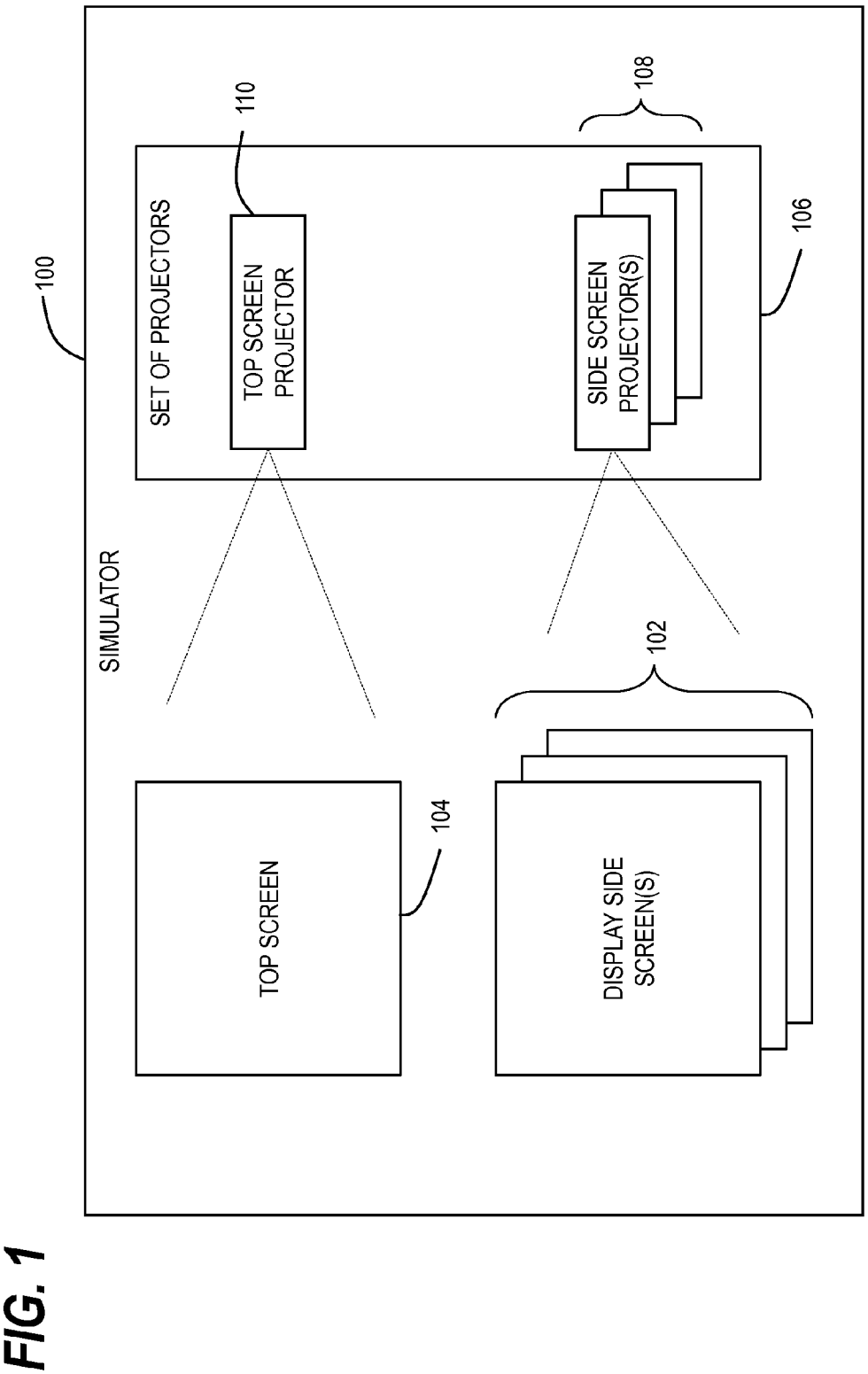
FIG. 1 illustrates one embodiment of simulator that may incorporate further embodiments disclosed herein.

FIG. 1 is a block diagram of a simulator in accordance with an advantageous embodiment. Simulator 100 is any type of visual display system for providing a full field of view display, such as, but not limited to, a flight simulator, a vehicle driver simulator, a planetarium display system, or any other type of full field of view display system. Simulator 100 includes a display side screen 102, (or a plurality of screens), that may include a set of one or more display side screens. In other words, the display side screen 102 may include a single continuous screen or two or more adjacent screens. The display side screen 102 may be a display screen that is curved according to embodiment presented herein to create constant vertical resolution of the full view image displayed on the screen.

Simulator 100 optionally may include a single top screen 104 for displaying images in a high definition format. Top screen 104 may be a circular shaped screen for displaying images and may be either flat or domed-shaped.

Set of projectors 106 includes one or more projectors that may be homogenous projectors of the same type, the same aspect ratio, and/or the same number of pixels. In another embodiment, the set of projectors 106 includes heterogeneous projectors having different types of projectors, different numbers of pixels, and/or generating images with different aspect ratios.

A side screen projector 108, (or a number of side screen projectors corresponding to multiple display side screens 102), is associated with the display side screen 102 for projecting an image thereon. A set of projectors 106 may optionally include a top screen projector 110 that may have one or more projectors in a unique projector arrangement for top screen 104. For example, top screen projector 110 may include, without limitation, a single projector or a pair of projectors. In one embodiment, none of the images are rotated on the screen so projection mirrors may not be required for projector roll. In other words, the projectors in set of side screen projectors 108 and top screen projector 110 are oriented with zero roll. Simulator 100 may optionally include another embodiment where a set of one or more mirrors (not shown) project images from each projector to the screens 102, 104. One or more projector images may be rotated into a portrait display mode using one or more mirrors.

Figure 2:
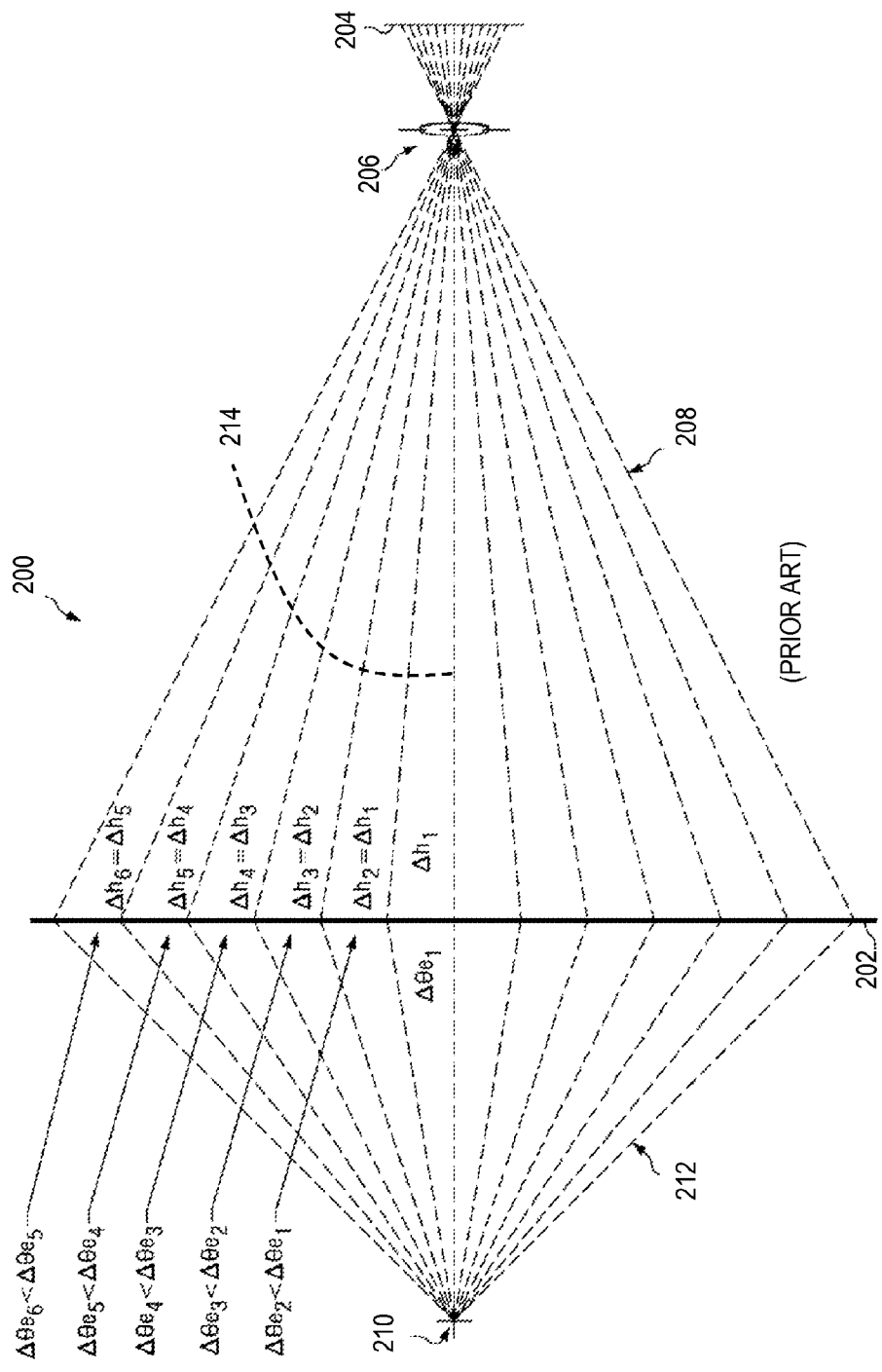
FIG. 2 illustrates a schematic representation of a prior art flat rear-projection screen.

FIG. 2 is a block diagram of a prior art flat rear-projection screen geometry 200 illustrating an image projected onto a flat rear-projection screen 202. Image origin 204 is an origin of an image generated by a fixed rectangular array of sources associated with a high definition format projector, (not shown), such as an array of pixels. Conventional projection lens 206 is a lens for focusing and magnifying the image produced by the fixed rectangular array of sources and is typically located inside the projector.

Image projector rays 208 are light rays carrying the image from the image origin 204 through the conventional projection lens 206. Image projector rays 208 are separated by a fixed distance $\Delta h$ when imaged upon the flat rear-projection screen 202. Thus, projector rays 208 are equally spaced height rays projected onto a plane represented by the flat rear-projection screen 202.

From a design eye-point 210, observed image rays 212 are observed with a constant increment of height $\Delta h$ to produce a higher angular resolution at the edge of the flat rear-projection screen 202 than at the center thereof. When equal height spaced image projector rays 208 are projected onto the flat rear-projection screen 208, unequal angles result between the illustrated observed image rays 212 when the image is viewed at the design eye-point 210. Thus, the resolution of the image displayed on the flat rear-projection screen 202 varies in resolution from the center of the screen to the edges of the screen when viewed by an observer inside a simulator at approximately the center of the simulator design eye-point 210 by creating a non-uniform image resolution on the flat rear-projection screen 202.

Alternatively stated, as illustrated, image projector rays 208 define equal distances of each segment $\Delta h1$-$\Delta h6$ on the flat rear-projection screen 202. However, their corresponding angles $\Delta \theta e1$-$\Delta \theta e6$ as measured from the design eye-point 210 along the observed image rays 212 decrease as the angles diverge from the centerline 214 defined between the conventional projection lens 206 and the design eye-point 210.

Figure 3:
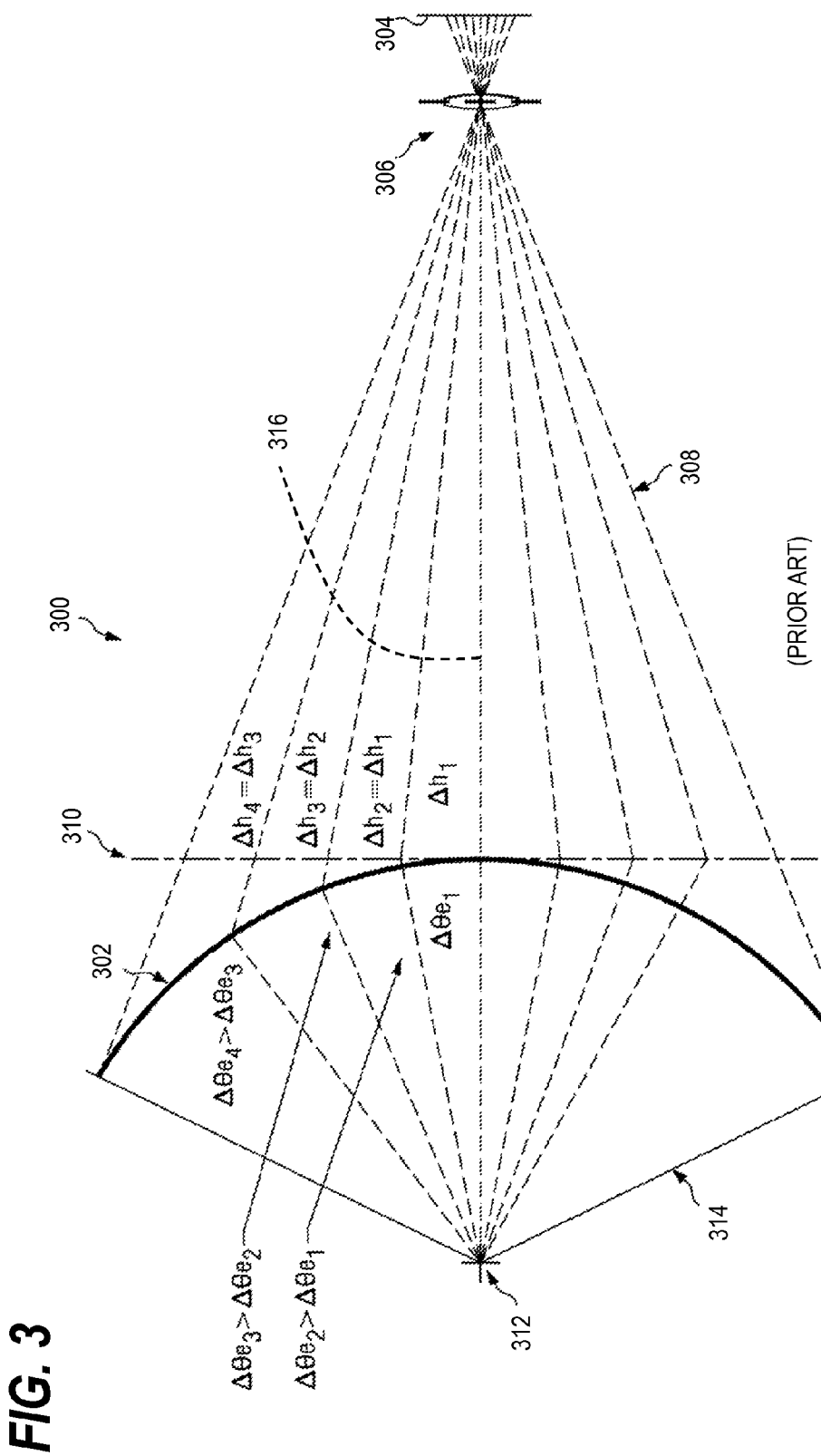
FIG. 3 illustrates a schematic representation of a prior art dome shaped rear-projected screen.

FIG. 3 is a block diagram of a prior art spherical rear-projection screen geometry 300 illustrating an image projected onto a dome shaped spherical rear-projection screen 302. Image origin 304 is an origin of an image generated by a fixed rectangular array of sources associated with a high definition format projector, (not shown), such as an array of pixels. Conventional projection lens 306 is a lens for focusing and magnifying the image produced by the fixed rectangular array of sources and is typically located inside the projector.

Image projector rays 308 are light rays carrying the image from the image origin 304 through the conventional projection lens 306. Image projector rays 308 are separated by a fixed distance $\Delta h$ as the image projector rays 308 pass through a plane, represented by line 310, normal to the centerline direction of the image projector rays 308 toward the spherical rear-projection screen 302. The image projector rays 308 fall upon an exterior convex side of the spherical rear-projection screen 302 where each image projector ray 308 is separated by a fixed distance $\Delta h$.

A user sitting at the design eye-point 312 center curvature at the radius of the spherical rear-projection screen 302 views the interior displayed images projected upon the outside of the dome shaped spherical rear-projection screen 302. Spherical rear-projection screen 302 is a spherical, dome-shaped rear projection screen having a surface defined by a fixed radius (at 314) from the design eye-point 312.

From a design eye-point 312, observed image rays 314 are observed with a constant increment of height $\Delta h$ to produce a higher angular resolution at the center of the spherical rear-projection screen 302 than at the edges thereof. When equal height spaced image projector rays 308 are projected through the plane 310 onto the exterior surface of the spherical rear-projection screen 302, unequal angles result between the illustrated observed image rays 314 when the image is viewed at the design eye-point 312. Thus, the resolution of the image displayed on the spherical rear-projection screen 302 varies in resolution from the edges of the screen to the center of the screen when viewed by an observer inside a simulator at approximately the center of the simulator design eye-point 312 by creating a non-uniform image resolution on the spherical rear-projection screen 302. In other words, equal height $\Delta h$ in projection rays 308 result in unequal angle separation in the observed image rays 314 and variable resolutions in the displayed image viewed from design eye-point 312. This results in inefficient use of pixels and non-optimal image resolution.

However, in the following disclosed embodiments, a single display screen having an optimized screen curvature is provided to display images with a constant vertical resolution. As shown in FIGS. 2 and 3, prior art flat rear-projection screen 202 and dome shaped spherical rear-projection screen 302 do not provide constant vertical resolution when viewing a projected image from the design eye-point 210, 312 across their respective screen surfaces. However, the embodiments presented hereafter provide a screen having an optimized curvature that enables display of images on the screen with constant vertical resolution.

The constant vertical resolution screen curvature is defined as the curvature of a screen that is necessary to produce constant vertical resolution or near constant vertical resolution of images displayed on the screen. The constant vertical resolution screen curvature maps equal sized pixels in a projector to equal angles as viewed from the eye-point in the user's field of view.

Figure 4:
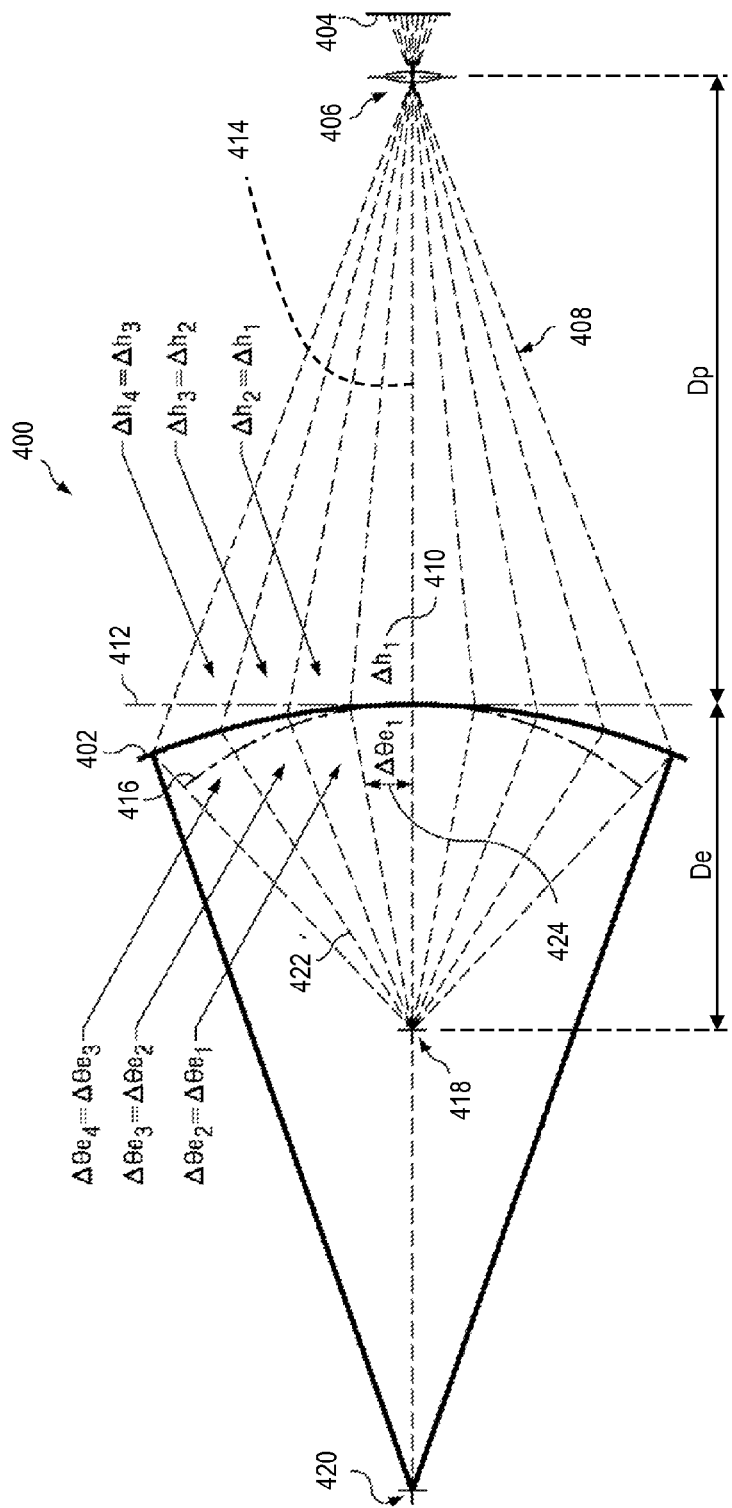
FIG. 4 illustrates a schematic representation of a rear-projection screen according to another embodiment presented herein having a constant vertical resolution curvature.

FIG. 4 illustrates constant vertical resolution curvature projection geometry 400 having a cross-section schematic view of a constant vertical resolution rear-projection screen 402 with a constant vertical resolution curvature in accordance with an advantageous embodiment presented herein.

The image origin 404 is the source of an image generated by a fixed rectangular array associated with a high definition format projector, (not shown), such as an array of pixels. Conventional projection lens 406 is a lens for focusing and magnifying the image produced by the fixed rectangular array of sources and is typically located inside the projector.

Image projector rays 408 are light rays carrying the image from the image origin 404 through the conventional projection lens 406. Constant separation image projector rays 408 are separated by a constant image separation distance Δh 410 as the constant separation image projector rays 408 pass through a plane, represented by line 412, normal to the centerline 414 direction of the constant separation image projector rays 408 toward the constant vertical resolution rear-projection screen 402. Plane 412 represents a flat rear-projection screen similar to the representative illustration of FIG. 2. The constant separation image projector rays 408 fall upon an exterior convex side of the constant vertical resolution rear-projection screen 402 where each image projector ray 408 is separated by a constant image separation distance Δh 410.

A location of a traditional spherical projection screen 416 with a constant radial distance to design eye-point 418 is similar to the representative illustration of FIG. 3. Design eye-point 418 is the point at which an observer might observe the image displayed on a flat screen at plane 412, the constant vertical resolution curvature rear projection screen 402 or curved screen 416. The center of constant vertical resolution curvature 420 is a center of curvature of a rear projection screen producing constant vertical resolution in conjunction with rear projection from a fixed matrix projector. The observed image equal angular rays 422 from the design eye-point 418 are intersected with the constant separation image projector rays 408 to form a locus of points defining the constant vertical resolution screen curvature at screen surface 402.

Thus, as shown in FIG. 4, there is an optimum screen curvature shown for a screen represented by constant vertical resolution rear-projection screen 402 such that constant image separation distances Δh 410 in the format of the projector's imaging chip 404 are mapped onto equal angles Δθe 424 of the observed image rays equal angular rays 422 for the viewing position at design eye-point 418. This curve 402 can be approximated to a high degree of accuracy by an arc of a radius 420 larger than the distance from design eye-point 418 to the curved screen 416 and which varies with image projection distance along the centerline 414 to the constant vertical resolution rear-projection screen 402.

In one embodiment, the curvature of a screen necessary to form a constant vertical resolution screen curvature 402 is determined by the constant separation image projector rays 408 from image source 404, through lens 406 projected through a plane 412 with constant image separation distance Δh 410. The observed image equal angular rays 422 with equal-angular separation Δθe 424 are projected from design eye-point 418 towards plane 412. The locus of points formed by the intersection of constant separation image projector rays 408 and observed image equal angular rays 422 thereby define the curvature of the constant vertical resolution screen surface 402. The curvature of the constant vertical resolution screen can be approximated by a section of a sphere with an optimum radius determined by selection of a radius which results in an optimum resolution variation from that produced with the constant vertical resolution screen.

Figure 5:
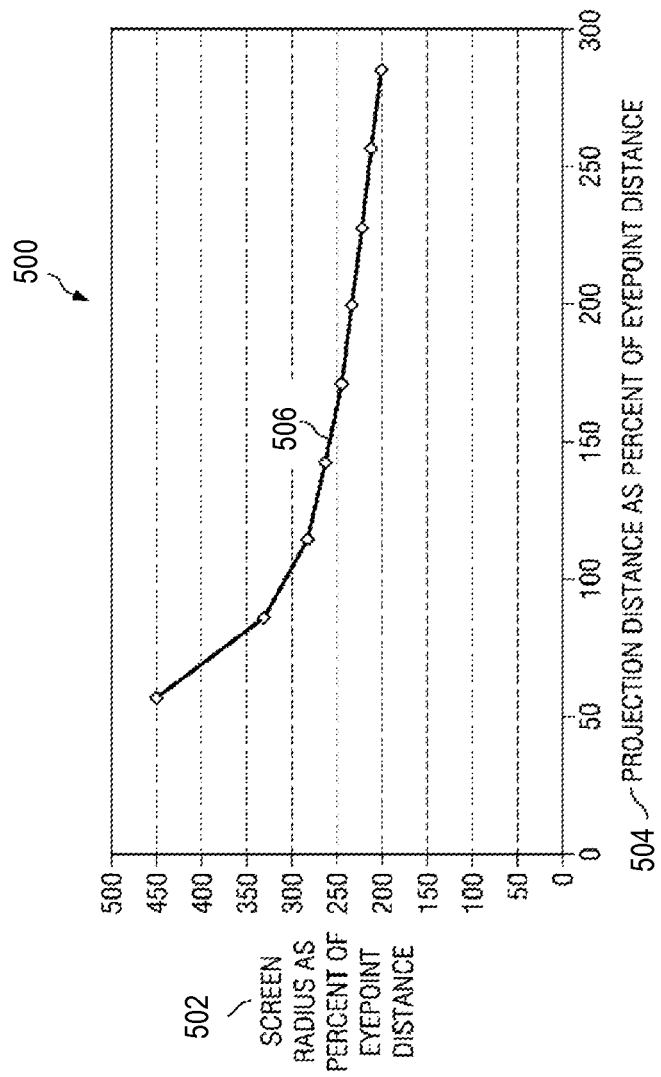
FIG. 5 is a graph illustrating a relationship between a screen radius and a projection distance in accordance with an embodiment presented herein.

The optimum curvature of the constant vertical resolution screen is a function of projector distance Dp and design eye-point distance De along centerline 414 between the projection lens 406 and the design eye-point 418. FIG. 5 illustrates a graph of a relationship between screen radius and projection distance in accordance with an advantageous embodiment. Graph 500 is a graph mapping the relationship between screen radius 502 and projection distance 504. In this graph, the optimum relationship between screen radius 502 and projection distance 504 is expressed as a percentage of observer viewing distance. As shown in line 506, the optimum curve in the rear projection screen to produce a constant vertical resolution in an image displayed on the screen is determined as a function of eye-point distance and projection distance.

Thus, to determine the optimum curve for a particular screen, an optimum radius is determined. The optimum radius may be identified using line 506 to determine the optimum relationship between projection distance, viewing distance, and the radius of a sphere. The viewing distance is the distance from an observer's eye to the display screen.

Figure 6:
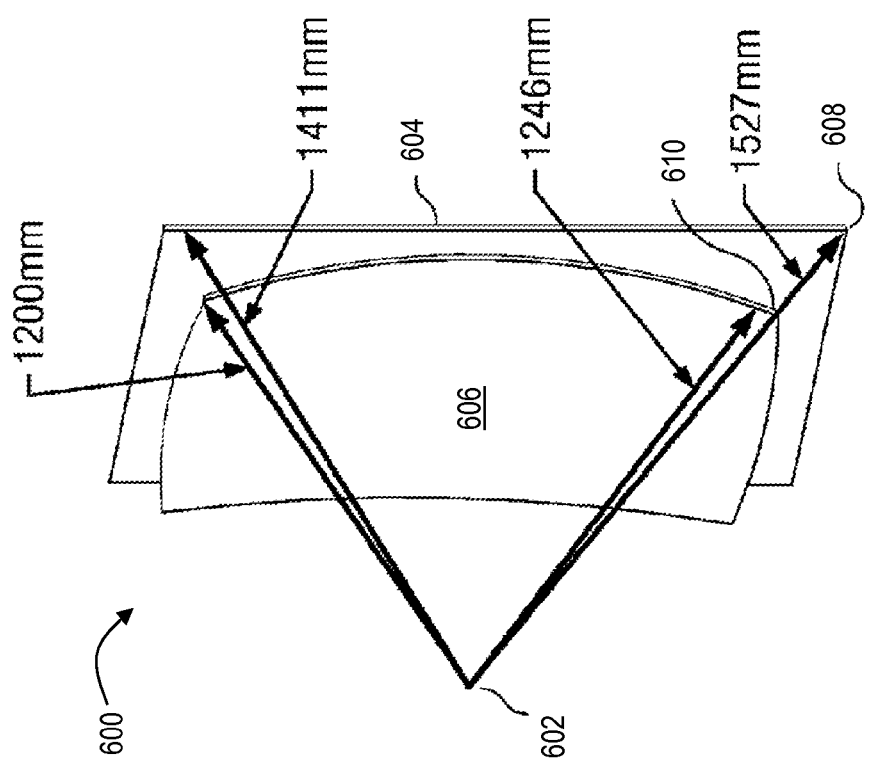
FIG. 6 illustrates another embodiment of a comparison of a perspective partial view of an eye-point to constant vertical resolution curvature screen distance versus an eye-point to a prior art flat screen distance.

FIG. 6 is a block diagram illustrating eye-point to screen distance in accordance with an advantageous embodiment. Eye to screen distances 600 are distances from an observer's eye-point 602 to a flat screen 604 and a curved screen 606. The distances from the observer's eye-point 602 to the screens are shown for several critical points. These distances are commonly referred to as eye relief and it is desirable to minimize the variation in these distances as encountered by the viewer in order to reduce the change in accommodation required to focus on the detail found at different points in the wide field of view afforded by the display system. As can be seen, the distance from observer's eye-point 602 to flat screen 604 is greater at each point than the distance from eye-point to curved screen 606. For example, the distance from eye-point 602 to flat screen 604 at point 608 is 1527 millimeters. However, the distance from observer's eye-point 602 to corresponding point 610 on curved screen 606 is only 1246 millimeters. This is a difference of approximately 281 millimeters in distance from the viewer's eye-point to the flat screen versus the distance from the viewer's eye-point to the corresponding point on the curved screen.

In addition, the resolution of a given display system can be improved by utilizing a projector with a greater number of pixels. In other words, if projectors are being used that provide a 20/40 acuity configuration, a 20/20 acuity configuration can be achieved by replacing the projectors with the lower number of pixels with projectors having a higher number of pixels. Thus, this embodiment allows a user to easily upgrade the display system image to full two (2) arc-minute resolution by performing a simple projector exchange.

Figure 7:
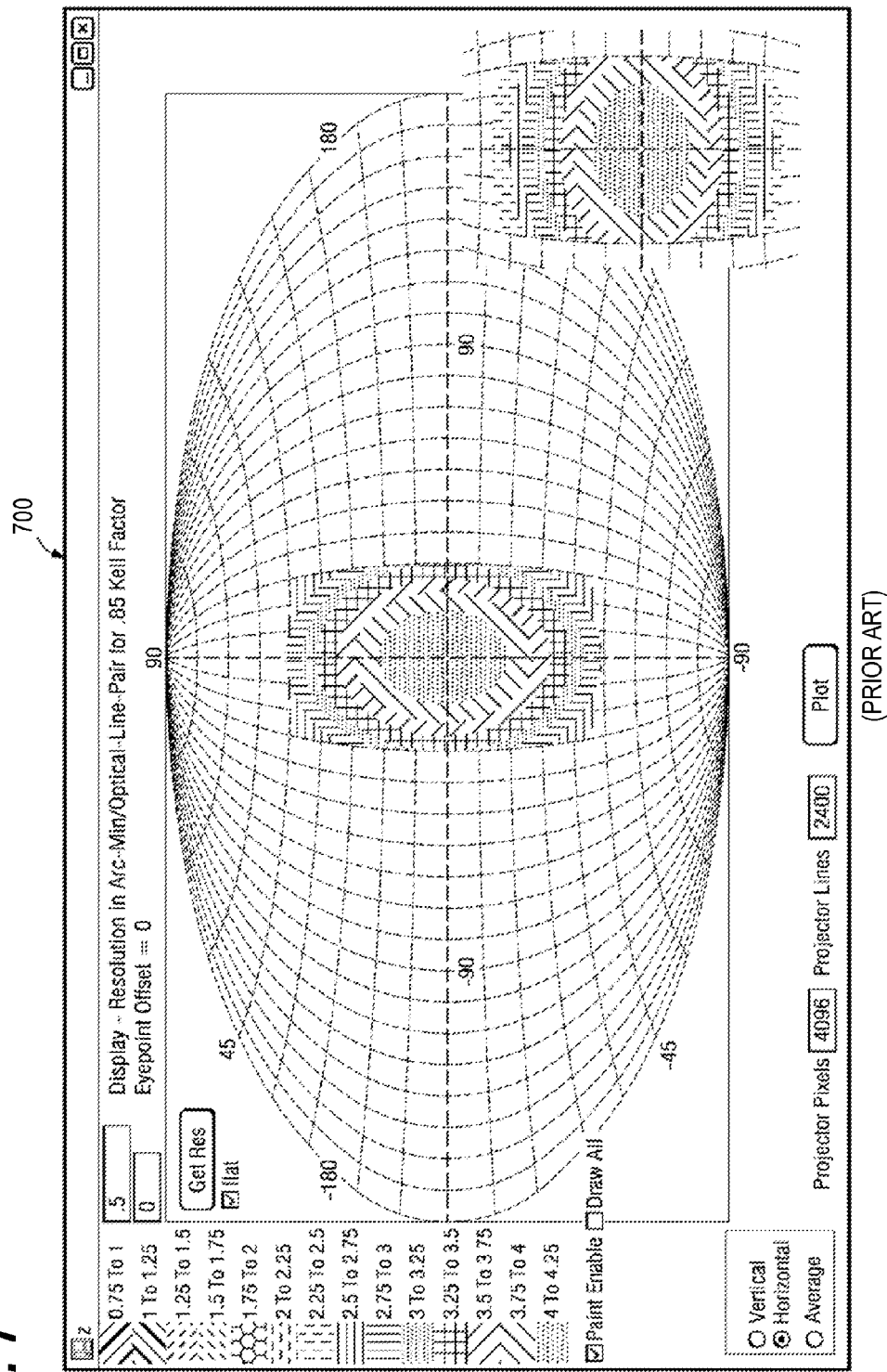
FIG. 7 is a graph illustrating a horizontal resolution for a flat screen distance in accordance with the prior art.

FIG. 7 is a block diagram illustrating a horizontal resolution for a prior art flat screen distance. FIG. 7 shows a horizontal resolution for a flat screen associated with a particular projector used to display a field of view which is 60 degrees wide and 50 degrees up by 45 degrees down as viewed from the design eye-point.

Display resolution 700 shows a display resolution in arc-minutes per optical line pair. In optical line pairs, a black line is displayed with a white line. The resolution indicates how many black line and white line pairs can be distinguished by a viewer assuming that the projector provides a particular number of pixels and that the line pairs displayed have been pre-filtered to reduce aliasing to an acceptable level such that the indicated resolution is discernible for any phasing of the line pairs vs. the pixel structure of the projectors. At 4096 pixels and 2400 projector lines, the horizontal and vertical resolution for a flat screen having a full field of view display image varies across the screen.

Figure 8:
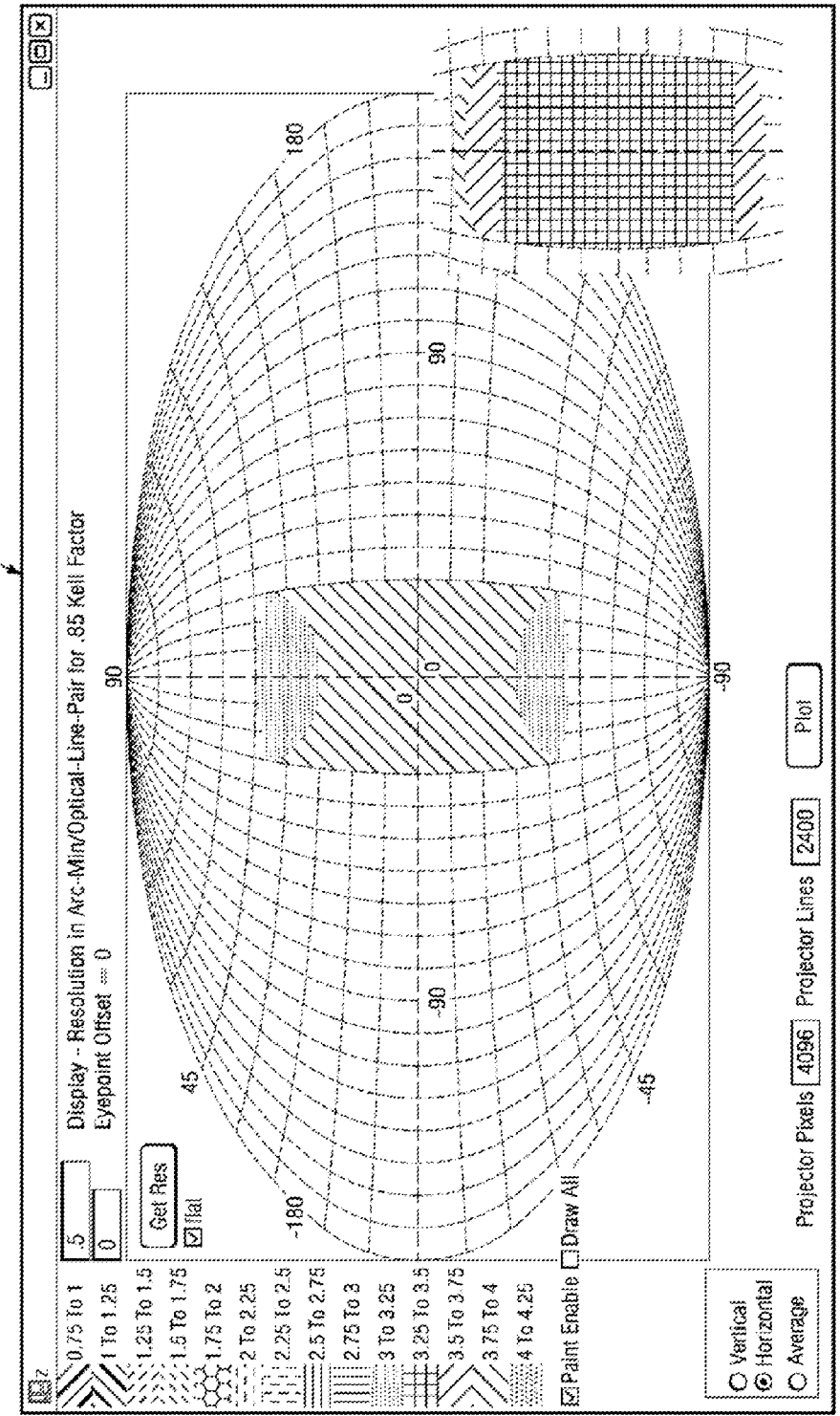
FIG. 8 is a graph illustrating a horizontal resolution for a curved screen distance in accordance with an advantageous embodiment.

FIG. 8 is a block diagram illustrating a horizontal resolution for a constant vertical resolution curved screen in accordance with the embodiments presented herein and using the same projector and image generator, and having the same field of view from the design eye-point as for the prior art flat screen shown in FIG. 7 above. Display resolution 800 shows a display resolution in arc-minutes per optical line pair. At 4096 pixels and 2400 projector lines, the horizontal resolution for a slightly curved screen having a full field of view display image is nearly uniform across the screen. In addition, the worst case horizontal resolution for the optimally curved screen plotted in FIG. 8 are significantly better than the worst case horizontal resolution plotted for the flat screen shown in FIG. 7 above.

FIG. 9 illustrates another embodiment of creating a constant vertical resolution curvature screen surface, similar to FIG. 4. Projection geometry 900 is a diagram of an image projected onto a constant vertical resolution curvature screen to generate an image with constant vertical resolution. Conventional projection lens at point 902 is implemented as any type of known or available projection lens for projecting an image onto a rear projection screen by projecting an image from an image origin, (not shown, similar to lens 406 in FIG. 4), generated by a fixed, rectangular array of sources, such as pixels in fixed matrix format projector.

Equal height projection rays 904 are projected from an image origin via the projection lens 902 and are separated by a fixed distance Δh. The equally spaced heights of rays 902 projected from image origin intersect plane 906 defined as being tangent to a constant vertical resolution screen surface curve 908 and intersecting a centerline 910 defined between the projection lens 902 and an eye-point 912. Plane 906 represents a flat rear projection screen as representatively illustrated in FIG. 2. The constant vertical resolution screen surface curve 908 represents a cross section of a constant vertical resolution curvature rear projection screen. Curve 914 represents the location of a traditional curved projection screen with a constant radial distance to design eye-point 912 as representatively illustrated in FIG. 3. Design eye-point 912 is the point at which an observer might observe the image displayed on a flat screen at plane 906, the constant vertical resolution screen surface curve 908 or the traditional curved projection screen 914. The equal angular rays 916 separated by a fixed angular distance Me from eye-point 912 are intersected with the equal height rays 904 to form a locus of points defining the constant vertical resolution screen surface curve 908.

Thus, as similarly shown in FIG. 4, there is an optimum screen curvature shown for a constant vertical resolution screen surface curve 908 such that equal distances in the format of the projector's imaging chip, (similar to reference number 404 of FIG. 4), are mapped onto equal angles for the viewing position at design eye-point 912. The constant vertical resolution screen surface curve 908 is therefore defined as a function of elevation in a vertical direction relative to the design eye-point 912, and can be approximated to a high degree of accuracy by an arc of a radius, (similar to point 420 in FIG. 4) larger than the distance from the design eye-point 912 to the plane 906 and which varies with projector distance. FIG. 9 illustrates, for clarity purposes, a distance 918 from the projector lens at point 902 to the intersect plane 906 being equal to distance 920 from the design eye-point 912 to the intersect plane 906. However, these distances may vary according to the design requirements of the constant vertical resolution curvature screen surface and the information presented above with respect to FIG. 5.

The constant vertical resolution screen surface curve 908 is then rotated about a vertical axis 922 that passes through the center of the design eye-point 912 to create a constant vertical resolution curvature screen surface solid 930 having a circular cross section in a vertical direction normal to its vertical axis 922. From this solid 930, various sections thereof may have an image projected upon the respective sections from a position consonant with a projection lens at 902. Additionally, the constant vertical resolution curvature screen surface solid 930 may be fabricated from a plurality of screen pieces, or a tessellation of joined screens that together form the totality of the constant vertical resolution curvature screen surface solid 930.

FIGS. 10A-10C illustrate another embodiment of a constant vertical resolution curvature screen surface 1000 that receives an image from a single projection device although multiple projection devices may be used on other portions of the screen surface 1000 as shown in FIGS. 11A-11B below. FIG. 10A illustrates side-view of a constant vertical resolution curvature screen surface solid 1000 comprising a partial portion of the constant vertical resolution curvature screen surface solid 930 of FIG. 9. Likewise, FIGS. 10B and 10C illustrate top and isometric views of the constant vertical resolution curvature screen surface solid 1000, respectively. A representative image projector 1002 projects an image upon a section of the constant vertical resolution curvature screen surface solid 1000 as illustrated by the constant vertical ray projection lines 1004 that are separated by equal lateral distances represented by vertical intersect plane line 1006, and constant horizontal ray projection lines 1008 that are separated by equal lateral distances represented by horizontal intersect plane line 1010.

FIG. 10C additionally illustrates a top screen surface 1020, an azimuth curve 1030 defined by circle at the intersection of the top screen surface 1020 and the lateral sides of the constant vertical resolution curvature screen surface 1000. The top screen surface 1020 may be flat, as shown in FIG. 10C, or may have a constant resolution curvature (not shown) in two orthogonally oriented directions, that is, a horizontal direction and a vertical direction with respect to a corresponding image projector, (see for example, image projector 1150 in FIGS. 11A-11B). The constant vertical resolution screen surface curve 1040 is representatively illustrated by the intersection of the constant vertical ray projection lines 1004 and the constant vertical resolution curvature screen surface 1000. The constant vertical resolution screen surface 1000 may include a plurality of constant vertical resolution screen surfaces 1050, 1060, 1070 and 1080 that are butt-joined at their respective lateral edges, collectively illustrated as reference number 1090, to create the overall constant vertical resolution curvature screen surface 1000. This tessellation of constant vertical resolution screen surfaces 1050, 1060, 1070 and 1080 that creates the composite constant vertical resolution curvature screen surface 1000 maintains the constant vertical resolution screen surface curve 1040 at and through the joined lateral edges 1090 of each of the constant vertical resolution screen surfaces 1050, 1060, 1070 and 1080.

FIGS. 11A-11B illustrate another embodiment of a constant vertical resolution curvature screen surface, as shown in FIGS. 10A-10C, used to receive a number of images thereon from a plurality of projection devices. FIG. 11A illustrates a constant vertical resolution curvature screen surface solid 1100 similar to constant vertical resolution curvature screen surface solid 1000 of FIGS. 10A-10C. The constant vertical resolution curvature screen surface solid 1100 may be fabricated from a plurality of constant vertical resolution curvature screen surfaces 1102, 1104, 1106, etc., that is a tessellation of screens that once attached together form the totality of the constant vertical resolution curvature screen surface solid 1100. Each of the plurality of constant vertical resolution curvature screen pieces may be joined at longitudinal side edges to form a seamless screen surface to substantially eliminate any dimensional incongruity thus providing a constant vertical resolution curvature screen for receiving the projected images on the outer surface of the screen while observed the inside at the design eye-point, as similarly described in FIGS. 10A-10C. This tessellation of constant vertical resolution screen surfaces that create the composite constant vertical resolution curvature screen surface 1100 maintains the constant vertical resolution screen surface curve at and through the joined lateral edges of each of the constant vertical resolution screen surfaces, as similarly described in FIGS. 10A-10C.

FIG. 11B illustrates four exemplary image projectors 1110, 1120, 1130 and 1140 are positioned at equal angular intervals around the constant vertical resolution curvature screen surface solid 1100 to project images thereon in a horizontal direction as illustrated by the constant vertical ray projection lines 1160 that are separated by equal lateral distances represented by vertical intersect plane line 1165, and constant horizontal ray projection lines 1170 that are separated by equal lateral distances represented by horizontal intersect plane line 1175.

A vertical fifth image projector 1150 is positioned in a vertical direction above the constant vertical resolution curvature screen surface solid 1100 and projects an image having constant vertical and horizontal ray projection lines 1180 upon the top screen surface 1152. The top screen surface 1152 may be flat, as shown in FIGS. 11A-11B, or may have a constant resolution curvature (not shown) in two orthogonally oriented directions, that is, a horizontal direction and a vertical direction with respect to the corresponding image projector 1150. Any number of image projectors may be used to project visual images on the any corresponding surface of the constant vertical resolution curvature screen surface solids 1100, 1000 or 930, or multiple image projectors may project images on the same region of the constant vertical resolution curvature screen surface solid 1100 based on the design needs of the projection system.

In summary, a visual image projection and display system, for example, represented by FIGS. 11A-11B, may include a tessellation of constant vertical resolution surfaces 1100 to display a single substantially constant vertical resolution image by blending projected images from image projectors, e.g., 1110-1140, on adjacent constant vertical resolution surfaces, wherein each constant vertical resolution surface, e.g., 1102, 1104, 1106, etc., is defined by any horizontal section of the constant vertical resolution surface 1100 normal to a central vertical axis 922 (of FIG. 9) of the tessellation of constant vertical resolution surfaces 1100 being a constant distance from the central vertical axis 922. A top screen surface 1152 intersecting the tessellation of constant vertical resolution surfaces 1100 is defined by a circular azimuth curve 1154, and a set of image projectors 1110-1150 correspond to each respective constant vertical resolution surface, e.g., 1102, 1104, 1106, etc., of the tessellation of constant vertical resolution surfaces 1100 and the top surface screen 1152.

Each constant vertical resolution surface being defined by at least a portion of a constant vertical resolution elevation curve, (908 of FIG. 9), being rotated about at least a portion of the central vertical axis 922 of the tessellation of constant vertical resolution surfaces 930, 1000 and 1100. The constant vertical resolution elevation curve 908 being based on a locus of points defined by an intersection of a set of equal angular increment lines 916 of a viewing distance from an eye-point 912 of the viewer to an inside surface of at least one constant vertical resolution surface 908 in a direction of at least one image projector with a set of equal pixel size increment lines 904 of a projected image from an image projector 902 based on a projection distance 918 from the image projector 902 to an outside surface of the at least one constant vertical resolution surface 908 in a direction of the eye-point 912 of the viewer.

The set of equal angular increment lines 916 are further defined by the viewing distance 920 from the eye-point 912 of the viewer being rotated in a vertical direction. The set of equal pixel size increment lines 904 are further defined by being constrained to a vertical plane 906 both at and normal to the projection distance 918 from the image projector 902. The tessellation of constant vertical resolution surfaces 1100 that display a single substantially constant vertical resolution image may be being utilized in a vehicle simulator for aircraft, land vehicles or any other environment where accurate visual imaging is needed for simulation purposes.

Figure 12:
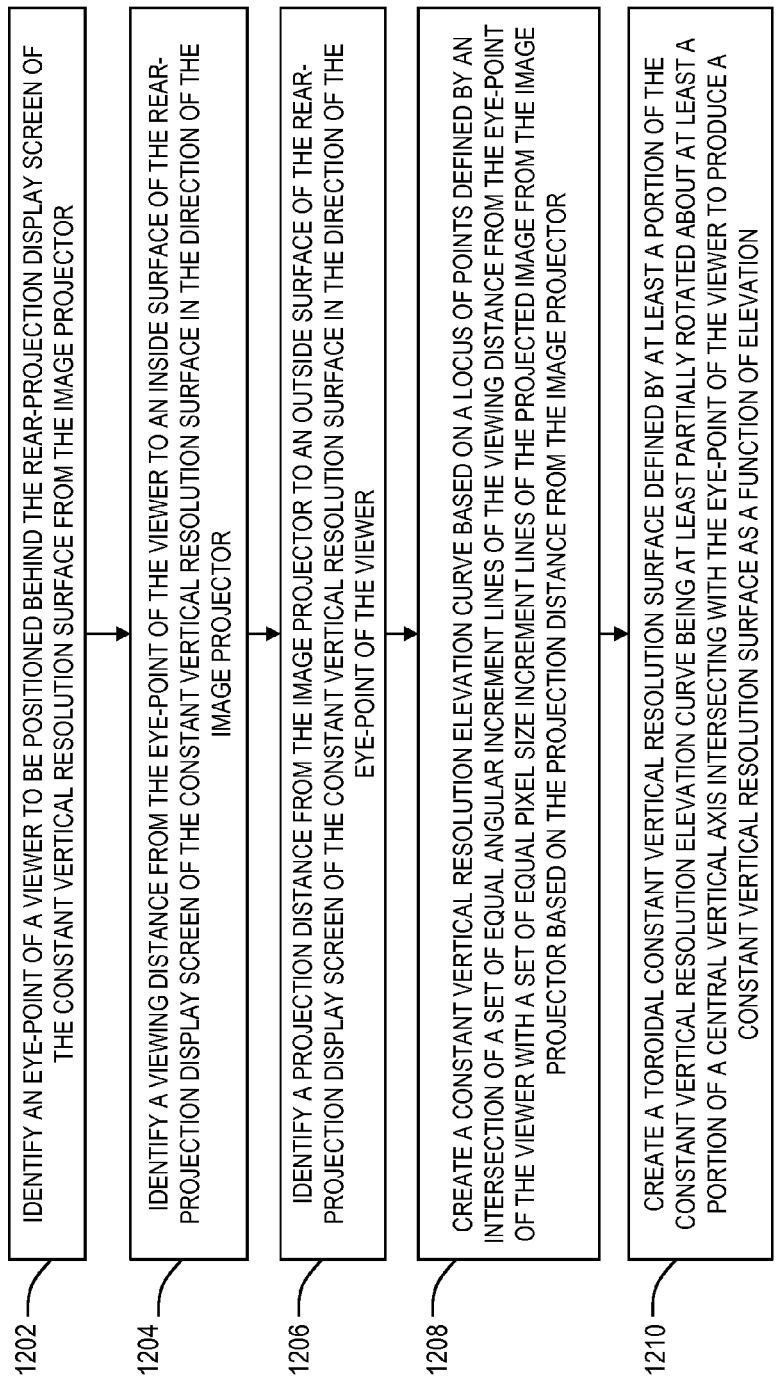
FIG. 12 is a logic flowchart illustrating a process for creating a constant vertical resolution display screen surface in accordance with the embodiments presented.

FIG. 12 is a logic flowchart illustrating a process for creating a constant vertical resolution display screen surface in accordance with the embodiments presented. The process includes identifying 1202 an eye-point of a viewer to be positioned behind the rear-projection display screen of the constant vertical resolution surface from the image projector. A viewing distance from the eye-point of the viewer to an inside surface of the rear-projection display screen of the constant vertical resolution surface is identified 1204 in the direction of the image projector. A projection distance from the image projector to an outside surface of the rear-projection display screen of the constant vertical resolution surface is identified 1206 in the direction of the eye-point of the viewer.

A constant vertical resolution elevation curve 908, (of FIG. 9), is then created 1208 based on a locus of points defined by an intersection of a set of equal angular increment lines 916 of the viewing distance from the eye-point 912 of the viewer with a set of equal pixel size increment lines 904 of the substantially constant vertical resolution projected image from the image projector at 902 based on the projection distance 918 from the image projector. The constant vertical resolution surface 930 is created 1210 being defined by at least a portion of the constant vertical resolution elevation curve 908 being at least partially rotated about at least a portion of a central vertical axis 922 intersecting the eye-point of the viewer 912 to produce a constant vertical resolution surface as a function of elevation.

The set of equal angular increment lines 916 are further defined by the viewing distance 920 from the eye-point 912 of the viewer being rotated in a vertical direction. The set of equal pixel size increment lines 904 are further defined by being constrained to a vertical plane 906 both at and normal to the projection distance 918 from the image projector at 902. The constant vertical resolution surface 930 further being defined by any horizontal section of the constant vertical resolution surface normal to the central vertical axis 922 being a constant distance from the central vertical axis.

The process further includes joining a plurality of the constant vertical resolution surfaces, 1102, 1104, 1106, etc., at their vertical edges to create a constant vertical resolution surface structure 1100, where each constant vertical resolution surface of the constant vertical resolution surface 1100 structure is capable of receiving and displaying a substantially constant vertical resolution projected image from an image projector, e.g., 1110-1140. The constant vertical resolution surface structure further being defined by any horizontal section of the constant vertical resolution surface structure normal to the central vertical axis 922 being a constant distance from the central vertical axis.

FIG. 13 is a logic flowchart illustrating a process for creating a constant vertical resolution display screen surface in accordance with the embodiments presented. A process that produces a full field of view display with a constant vertical resolution on a tessellation of constant vertical resolution surfaces acting as rear-projection display screens that receive and display substantially constant vertical resolution projected images from corresponding image projectors includes identifying 1302 an eye-point 912 of a viewer to be positioned behind at least one rear-projection display screen 908 of at least one constant vertical resolution surface 930 from an image projector at 902. A viewing distance 920 from the eye-point 912 of the viewer to an inside surface of the at least one rear-projection display screen of the at least one constant vertical resolution surface 908 is identified 1304 in the direction of the image projector at 902. A projection distance 918 from the image projector to an outside surface of the at least one rear-projection display screen 908 of the at least one constant vertical resolution surface is identified 1306 a in the direction of the eye-point 912 of the viewer.

A constant vertical resolution elevation curve 908 is created 1308 based on a locus of points defined by an intersection of a set of equal angular increment lines 916 of the viewing distance 920 from the eye-point 912 of the viewer with a set of equal pixel size increment lines 904 of the substantially constant vertical resolution projected image from the image projector 902 based on the projection distance 918 from the image projector at 902. At least one constant vertical resolution surface 930 is created 1310 being defined by at least a portion of the constant vertical resolution elevation curve 908 being at least partially rotated about at least a portion of a central vertical axis 922 constant vertical resolution intersecting with the eye-point of the viewer to produce a constant vertical resolution surface as a function of elevation. The plurality of the constant vertical resolution surfaces are joined 1312 at their vertical edges to create the tessellation of constant vertical resolution surfaces, and the full field of view display is displayed 1314 by projecting a plurality of projected images from corresponding image projectors having a substantially constant vertical resolution on the tessellation of constant vertical resolution surfaces.

The set of equal angular increment lines 916 are further defined by the viewing distance 920 from the eye-point 912 of the viewer being rotated in a vertical direction. The set of equal pixel size increment lines 904 are further defined by being constrained to a vertical plane 906 both at and normal to the projection distance 918 from the image projector at 902. The tessellation of constant vertical resolution surfaces e.g., 930, 1000, 1100, is further defined by any horizontal section of the tessellation of constant vertical resolution surfaces normal to the central vertical axis 922 being a constant distance from the central vertical axis.

The method further includes providing a top surface screen 1152 intersecting the tessellation of constant vertical resolution surfaces 1100 defined by a circular azimuth curve 1154. The method further includes blending images projected on adjacent constant vertical resolution surfaces, e.g., 1102, 1104, 1106, etc., generated by the corresponding image projectors 1110-1140 to produce a single substantially constant vertical resolution image on the tessellation of constant vertical resolution surfaces 1100. The corresponding image projectors 1110-1150 may generate images formatted with an aspect ratio of approximately sixteen by nine.

The constant vertical resolution display screen provides more constant vertical resolution than either prior art flat screens or dome shaped screens. Consequently, it also produces a better worst case resolution for a given field of view from the viewer eye-point and a given number of pixels arranged across that field of view. This is obvious because in a non-constant vertical resolution display there are variations in resolution such that some parts of the display are better than the average of the resolution at all of the parts of the display whereas on a uniform or nearly constant vertical resolution display all parts have resolution equal to or very near the average resolution. This is important to the design of a visual simulator for pilot training because the part of the display in which important visual detail will appear in a training scenario cannot be predicted in advance. Therefore the visual display system must be designed so that all parts of the display meet or exceed the worst case resolution value which has been determined to be required for performance of the most critical training tasks. The constant vertical resolution wide field of view display system described herein can provide that critical worst case resolution with fewer pixels and hence at lower cost than any other display system.

The display system of the advantageous embodiments described herein provides an improved vehicle simulator visual imaging. The display system may also be used in vehicle flight simulator, driver simulators, marine simulators, and other simulation devices. The display system may be used for improved training of pilots, drivers, mechanics, flight crew, and other personnel. The display system may also be used for design and development of vehicles and aircraft. In addition, the display system may also be used for education, such as in planetariums, as well as in entertainment.

An advantageous embodiment creates an eye-limited 2 arc-minute resolution or nearly eye-limited 4 arc minute, full field of view display system depending only upon the choice of projectors used. It efficiently tiles the full field of view of an air combat training visual display system with modern display high definition aspect ratio projectors and optimizes resolution uniformity with a minimum of wasted pixels.

The embodiments described herein solve the problem of inefficient utilization of image generator and display pixels when these pixels are projected by fixed matrix projectors, such as high definition format liquid crystal on silicon (LCoS) or digital light processing (DLP), rather than analog projectors, such as cathode ray tube (CRT), to form a continuous full field of view image on a rear projection screen for viewing by a pilot in a flight simulator.

The embodiments described herein provide more efficient use of projector and image generator pixels than is available today from existing solutions. This is accomplished by optimizing screen shape and curvature for high definition format projectors. Efficient use of pixels is important because such pixels are very expensive to procure and to support, and as a result, the visual system may drive the cost of fielding and supporting a mission-training center more than any other subsystem. The display system also provides increased modularity, which reduces procurement costs and support costs. The display systems are also well suited to applications, which require integration with helmet displays and night vision goggles.

The flowcharts and block diagrams in the different depicted embodiments illustrate the architecture, functionality, and operation of some possible implementations of the apparatus and methods. The function or functions noted in the flowchart operations may occur out of the order noted in the figures. For example, in some cases, two operations shown in succession may be executed substantially concurrently, or the operations may sometimes be executed in the reverse order, depending upon the operation involved.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A method of producing a toroidal constant vertical resolution surface acting as a rear-projection display screen for receiving and displaying a substantially constant vertical resolution projected image from an image projector, the method comprising:
    identifying an eye-point of a viewer to be positioned behind the rear-projection display screen of the constant vertical resolution surface from the image projector;
    identifying a viewing distance from the eye-point of the viewer to an inside surface of the rear-projection display screen of the constant vertical resolution surface in the direction of the image projector;
    identifying a projection distance from the image projector to an outside surface of the rear-projection display screen of the constant vertical resolution surface in the direction of the eye-point of the viewer;
    creating a constant vertical resolution elevation curve based on a locus of points defined by an intersection of
        a set of equal angular increment lines of the viewing distance from the eye-point of the viewer with
        a set of equal pixel size increment lines of the projected image from the image projector based on the projection distance from the image projector; and
    creating the toroidal constant vertical resolution surface defined by at least a portion of the constant vertical resolution elevation curve being at least partially rotated about at least a portion of a central vertical axis intersecting with the eye-point of the viewer to produce a constant vertical resolution surface in a vertical direction as a function of elevation.

2. The method of producing the toroidal constant vertical resolution surface according to claim 1, wherein the set of equal angular increment lines are further defined by the viewing distance from the eye-point of the viewer being rotated in a vertical direction.

3. The method of producing the toroidal constant vertical resolution surface according to claim 1, wherein the set of equal pixel size increment lines are further defined by being constrained to a vertical plane both at and normal to the projection distance from the image projector.

4. The method of producing the toroidal constant vertical resolution surface according to claim 1, wherein the constant vertical resolution surface further being defined by any horizontal section of the constant vertical resolution surface normal to the central vertical axis being a constant distance from the central vertical axis.

5. The method of producing the toroidal constant vertical resolution surface according to claim 1, wherein the central vertical axis intersects the eye-point of the viewer.

6. The method of producing the toroidal constant vertical resolution surface according to claim 1, further comprising joining a plurality of the constant vertical resolution surfaces at their vertical edges to create a constant vertical resolution surface structure,
    wherein each constant vertical resolution surface of the constant vertical resolution surface structure is capable of receiving and displaying a substantially constant vertical resolution projected image from an image projector.

7. The method of producing the toroidal constant vertical resolution surface according to claim 6, wherein the constant vertical resolution surface structure further being defined by any horizontal section of the constant vertical resolution surface structure normal to the central vertical axis being a constant distance from the central vertical axis.

8. A method of producing a full field of view display with a constant vertical resolution on a tessellation of toroidal constant vertical resolution surfaces acting as rear-projection display screens that receive and display substantially constant vertical resolution projected images from corresponding image projectors, the method comprising:
    identifying an eye-point of a viewer to be positioned behind at least one rear-projection display screen of at least one constant vertical resolution surface from an image projector;
    identifying a viewing distance from the eye-point of the viewer to an inside surface of the at least one rear-projection display screen of the at least one constant vertical resolution surface in the direction of the image projector;
    identifying a projection distance from the image projector to an outside surface of the at least one rear-projection display screen of the at least one constant vertical resolution surface in the direction of the eye-point of the viewer;
    creating a constant vertical resolution elevation curve based on a locus of points defined by an intersection of
        a set of equal angular increment lines of the viewing distance from the eye-point of the viewer with
        a set of equal pixel size increment lines of the projected image from the image projector based on the projection distance from the image projector;
    creating the at least one toroidal constant vertical resolution surface defined by at least a portion of the constant vertical resolution elevation curve being at least partially rotated about at least a portion of a central vertical axis constant vertical resolution intersecting with the eye-point of the viewer to produce a constant vertical resolution surface in a vertical direction as a function of elevation;
    joining a plurality of the constant vertical resolution surfaces at their vertical edges to create the tessellation of constant vertical resolution surfaces where each vertical edge of constant vertical resolution surface being defined by the constant vertical resolution elevation curve; and
    displaying the full field of view display by projecting a plurality of projected images from corresponding image projectors having a substantially constant vertical resolution on the tessellation of constant vertical resolution surfaces.

9. The method of producing the full field of view display according to claim 8, wherein the set of equal angular increment lines are further defined by the viewing distance from the eye-point of the viewer being rotated in a vertical direction.

10. The method of producing the full field of view display according to claim 8, wherein the set of equal pixel size increment lines are further defined by being constrained to a vertical plane both at and normal to the projection distance from the image projector.

11. The method of producing the full field of view display according to claim 8, wherein the tessellation of constant vertical resolution surfaces further being defined by any horizontal section of the tessellation of constant vertical resolution surfaces normal to the central vertical axis being a constant distance from the central vertical axis.

12. The method of producing the full field of view display according to claim 8, the method further comprising providing a top surface screen intersecting the tessellation of constant vertical resolution surfaces defined by a circular azimuth curve.

13. The method of producing the full field of view display according to claim 8, the method further comprising blending images projected on adjacent constant vertical resolution surfaces generated by the corresponding image projectors to produce a single substantially constant vertical resolution image on the tessellation of constant vertical resolution surfaces.

14. The method of producing the full field of view display according to claim 8, wherein the corresponding image projectors generate images formatted with an aspect ratio of approximately sixteen by nine.

15. A visual image projection and display system comprising:
   a tessellation of toroidal constant vertical resolution surfaces to display a single substantially constant vertical resolution image by blending projected images on adjacent toroidal constant vertical resolution surfaces, wherein each toroidal constant vertical resolution surface is defined by any horizontal section of the constant vertical resolution surface normal to a central vertical axis of the tessellation of constant vertical resolution surfaces being a constant distance from the central vertical axis;
   a top surface screen intersecting the tessellation of constant vertical resolution surfaces defined by a circular azimuth curve; and
   a set of image projectors corresponding to each constant vertical resolution surface of the tessellation of constant vertical resolution surfaces and the top surface screen.

16. The visual image projection and display system according to claim 15, wherein each constant vertical resolution surface being defined by at least a portion of a constant vertical resolution elevation curve being rotated about at least a portion of the central vertical axis of the tessellation of constant vertical resolution surfaces.

17. The visual image projection and display system according to claim 16, wherein the constant vertical resolution elevation curve being based on a locus of points defined by an intersection of
   a set of equal angular increment lines of a viewing distance from an eye-point of the viewer to an inside surface of at least one constant vertical resolution surface in a direction of at least one image projector with
   a set of equal pixel size increment lines of a projected image from an image projector based on a projection distance from the image projector to an outside surface of the at least one constant vertical resolution surface in a direction of the eye-point of the viewer.

18. The visual image projection and display system according to claim 17, wherein the set of equal angular increment lines are further defined by the viewing distance from the eye-point of the viewer being rotated in a vertical direction.

19. The visual image projection and display system according to claim 17, wherein the set of equal pixel size increment lines are further defined by being constrained to a vertical plane both at and normal to the projection distance from the image projector.

20. The visual image projection and display system according to claim 15, wherein the visual image projection and display system being utilized in a vehicle simulator.

* * * * *